UNITED STATES PATENT OFFICE.

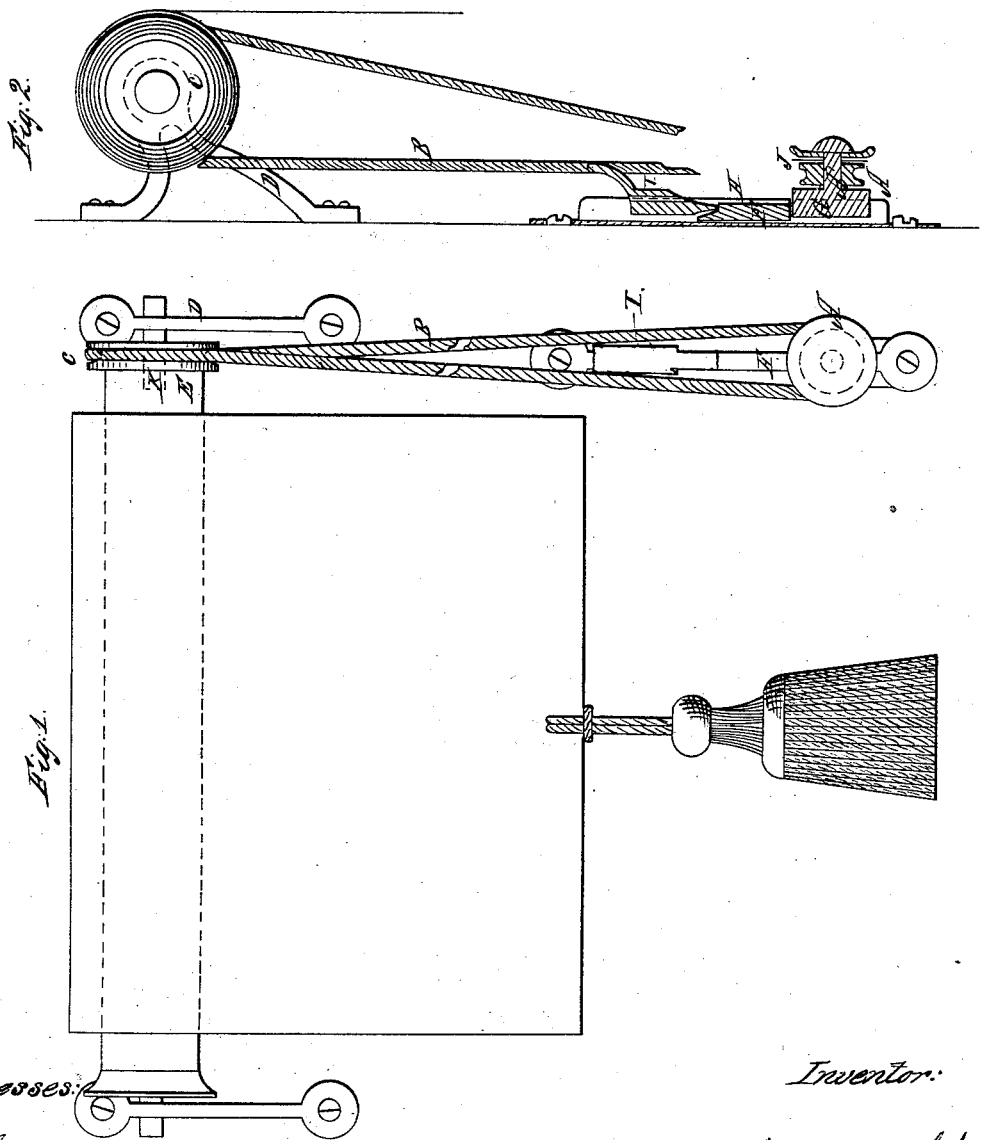

WILLIAM WEBSTER, OF MORRISANIA, NEW YORK, ASSIGNOR TO CHARLES GOODYEAR, JR.

IMPROVED SHADE-RACK.

Specification forming part of Letters Patent No. 38,205, dated April 14, 1863.

*To all whom it may concern:*

Be it known that I, WILLIAM WEBSTER, of Morrisania, in the county of Westchester and State of New York, have invented a certain new and useful Improvement in Shade-Racks and other Racks; and I do hereby declare that the following is a full and exact description thereof, reference being had to the accompanying drawings, which make a part of this specification.

The nature of my improvement consists of two parts: first, in the employment and use of an elastic or flexible roller or pulley in racks, which, in consequence of its adhesiveness to the axis and greater friction, holds a shade or other object connected with the rack more firmly, and with less strain upon the cord; second, in the employment and use in racks of an adjustable spring so constructed and arranged that any desired tension can be given to the cord or band.

To enable others to make and use my improvement, I will proceed to describe its construction and operation.

Figures 1 and 2 of drawings represent a front and side view of a shade rack and fixtures.

A represents an elastic or flexible roller rotating upon its axle A'.

B represents a cord or band which passes around the roller A and another roller, C. Said roller C may also be made elastic or flexible and turn upon an axle, K.

F represents the second part of my improvement, namely, an adjustable spring attached to or bearing on one side against the slide G, to which is attached the roller-axle A' within the case or body of the fixture H. The other end or side of the spring is or may be secured by a wedge, I, or by some other device. When tension has been given to the cord either by the applied stress of the wedge I acting upon the spring F, or by the wedge or its equivalent acting upon the slide G, if no spring is used the tension of the cord will cause the elastic or flexible roller A to adhere to or bind the axle, creating a resistance or friction upon the axle sufficient to keep or retain the shade, &c., at any required height or position with very little strain upon the cord. Additional friction may sometimes be had by putting thin rubber J or its equivalent in between the side or sides of the roller A and the sides of the roller-bearings.

It will be perceived that thus by my improvement a great advantage is gained over the old method, in which an elastic and inflexible brass or other rigid roller is used.

Having thus fully described the nature, construction, and operation of my improvement, I wish it to be understood that I do not claim the use of an elastic band around the circumference of rollers, as that is no part of my invention, for my invention contemplates an elastic pressure upon the axle of the roller.

What I claim as my invention and as a new manufacture, and desire to secure by Letters Patent, is—

1. The employment and use of an elastic or flexible roller in racks, substantially as herein set forth and described.

2. The employment and use of an adjustable spring in racks, substantially as herein set forth and described.

WILLIAM WEBSTER.

Witnesses:
JOHN R. MORHOUS,
JAMES A. DORR.